(12) United States Patent
Combes et al.

(10) Patent No.: US 10,647,441 B2
(45) Date of Patent: May 12, 2020

(54) REAR ENGINE ATTACHMENT FOR AN AIRCRAFT ENGINE

(71) Applicant: Airbus Operations SAS, Toulouse (FR)

(72) Inventors: Stéphane Combes, Buzet sur Tarn (FR); Jean Geliot, Toulouse (FR); Thomas Deforet, Toulouse (FR); Adeline Soulie, Verdun sur Garonne (FR); Benoit Orteu, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 16/192,950

(22) Filed: Nov. 16, 2018

(65) Prior Publication Data

US 2019/0152615 A1    May 23, 2019

(30) Foreign Application Priority Data

Nov. 21, 2017  (FR) ...................... 17 61012

(51) Int. Cl.
  *F16M 13/00*  (2006.01)
  *B64D 27/26*  (2006.01)
  *F02C 7/20*   (2006.01)

(52) U.S. Cl.
  CPC ............ *B64D 27/26* (2013.01); *F02C 7/20* (2013.01); *B64D 2027/262* (2013.01); *B64D 2027/266* (2013.01); *F05D 2220/323* (2013.01); *F05D 2240/90* (2013.01)

(58) Field of Classification Search
  CPC .............. B64D 27/26; B64D 2027/266; B64D 2027/268
  See application file for complete search history.

(56) References Cited

U.S. PATENT DOCUMENTS

| | | | |
|---|---|---|---|
| 3,907,220 A * | 9/1975 | Amelio | B64D 27/18 244/54 |
| 4,997,145 A | 3/1991 | Hodgkinson | |
| 5,275,357 A * | 1/1994 | Seelen | B64D 27/26 244/54 |
| 5,649,417 A | 7/1997 | Hey | |

(Continued)

FOREIGN PATENT DOCUMENTS

| | | |
|---|---|---|
| EP | 0744338 A1 | 11/1996 |
| EP | 1281615 A1 | 2/2003 |

(Continued)

OTHER PUBLICATIONS

French Search Report; priority document.

*Primary Examiner* — Amy J. Sterling
(74) *Attorney, Agent, or Firm* — Greer, Burns & Crain Ltd.

(57) ABSTRACT

A rear engine attachment for an engine of an aircraft which comprises a pylon having a bottom face, the rear engine attachment comprising a first fitting configured to be fixed against the bottom face and having a wall, a second fitting configured to be secured to a structural casing of the engine, two front links and two rear links, which are fixed by one and the same main link point to the wall and by two link points on either side of the second fitting. Such a motorization assembly allows for a reduction of the bulk, in particular at the rear engine attachment, which helps in improving the overall performance of the motorization assembly.

18 Claims, 2 Drawing Sheets

(56) References Cited

U.S. PATENT DOCUMENTS

| | | | | |
|---|---|---|---|---|
| 6,341,746 B1* | 1/2002 | Pascal | ................... | B64D 27/26 |
| | | | | 244/54 |
| 6,758,438 B2* | 7/2004 | Brefort | ................. | B64D 27/26 |
| | | | | 244/54 |
| 9,217,337 B2* | 12/2015 | Sandy | ....................... | F02C 7/20 |
| 9,701,412 B2* | 7/2017 | Stretton | ................ | B64D 27/26 |
| 2003/0025033 A1* | 2/2003 | Levert | ................... | B64D 27/26 |
| | | | | 244/54 |
| 2013/0302157 A1 | 11/2013 | Sandy et al. | | |
| 2014/0183298 A1 | 7/2014 | Brochard et al. | | |

FOREIGN PATENT DOCUMENTS

| | | |
|---|---|---|
| FR | 3000529 A1 | 7/2014 |
| GB | 2224707 A | 5/1990 |

\* cited by examiner

REAR ENGINE ATTACHMENT FOR AN AIRCRAFT ENGINE

CROSS-REFERENCES TO RELATED APPLICATIONS

This application claims the benefit of the French patent application No. 1761012 filed on Nov. 21, 2017, the entire disclosures of which are incorporated herein by way of reference.

BACKGROUND OF THE INVENTION

The present invention relates to a rear engine attachment for an aircraft engine, and an aircraft comprising at least one such rear engine attachment.

An aircraft conventionally comprises a wing under which is fixed a pylon to which an engine is fixed. The engine is fixed to the pylon via a system of attachments comprising, among other things, at the front, a front engine attachment and, at the rear, of a rear engine attachment. The assembly composed of the pylon and its system of attachments is situated radially above the engine, in a clock segment that can be defined between 10 am and 2 pm and crosses the secondary jet of the engine. In order to reduce the aerodynamic disturbances induced by this crossing arrangement, the pylon and its system of attachments are faired by an aerodynamic fairing called a fork. This fork is composed of panels of complex forms which promote the flow of the air in the nacelle and are fixed onto the side walls of the pylon.

The front engine attachment and the rear engine attachment are conventionally fixed under the pylon and the rear engine attachment is designed to take up, among other things, the moment Mx. These various stresses require particular structures for the engine attachments, which makes them relatively imposing by taking up a lot of space in the fork crossing the secondary jet of the jet engine. It is therefore necessary to find new forms for the engine attachments in order to limit the bulk in this fork and thus improve the performance of the jet engine through a reduction of the aerodynamic blocking of its secondary jet.

SUMMARY OF THE INVENTION

One object of the present invention is to propose a rear engine attachment which has a reduced bulk compared to the rear engine attachment systems of the prior art.

To this end, a rear engine attachment is proposed for an engine of an aircraft which comprises a pylon having a bottom face, the rear engine attachment comprising:

a first fitting intended to be fixed against the bottom face and comprising a wall which extends in a plane at right angles to a longitudinal axis X and having a front face intended to be oriented towards the front of the aircraft and a rear face intended to be oriented towards the rear of the aircraft, a second fitting intended to be secured to a structural casing of the engine, the second fitting extending in a plane at right angles to the longitudinal axis X and having a front face intended to be oriented towards the front of the aircraft and a rear face intended to be oriented towards the rear of the aircraft, a front inner link,
a rear inner link,
a front outer link, and
a rear outer link, where the front inner link has a rear face which is positioned facing the front face of the wall and facing the front face of the second fitting, where the rear inner link has a front face which is positioned facing the rear face of the wall and facing the rear face of the second fitting, where the front outer link has a rear face which is positioned facing the front face of the front inner link, where the rear outer link has a front face which is positioned facing the rear face of the rear inner link, where the front inner link is fixed by a main link point to the wall and by a first and a second link points to the second fitting, where the front outer link is fixed by the same main link point to the wall and by the same first and another second link points to the second fitting, where the rear inner link is fixed by the same main link point to the wall and by the same first and the same second link points to the second fitting as the front inner link, where the rear outer link is fixed by the same main link point to the wall and by the same first and the same second link points to the second fitting as the front outer link.

Such a rear engine attachment has a reduced bulk. Furthermore, according to variants, such a rear engine attachment forms an isostatic assembly and a relative mobility between the two links allowing an adaptation in case of thermal expansion of the engine.

Advantageously, the main link point comprises a bore passing through the wall, a bore passing through each link and an axis which is fitted into the bore of each link and into the bore of the wall, each link point to the second fitting comprises a bore passing through the second fitting, for each link associated with the link point, a bore passing through the link and an axis which is fitted into the bore of each link and into the bore of the second fitting.

Advantageously, the main link point is mounted without play, each second link point is mounted without play, the first link point is mounted with play at the second fitting, the first link point is mounted without play at the inner links, and the first link point is mounted with play at the outer links.

The invention also proposes an aircraft comprising a pylon having a bottom face, an engine having a structural casing and a rear engine attachment according to one of the preceding variants, where the first fitting is fixed against the bottom face, and where the second fitting is secured to the structural casing.

BRIEF DESCRIPTION OF THE DRAWINGS

The features of the invention mentioned above, and others, will emerge more clearly on reading the following description of an exemplary embodiment, the description being given in relation to the attached drawings, in which.

DETAILED DESCRIPTION OF THE PREFERRED EMBODIMENTS

Figure 1:
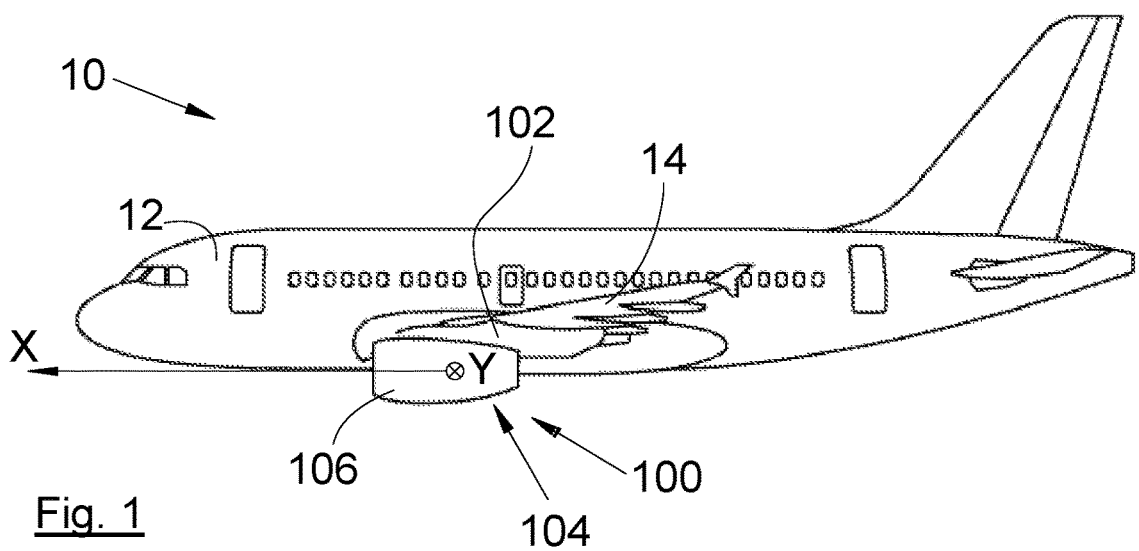
FIG. 1 is a side view of an aircraft having at least one rear engine attachment according to the invention.

In the following description, the terms relating to a position are taken with reference to an aircraft in normal position of advance, that is to say, as is represented in FIG. 1.

FIG. 1 shows an aircraft 10 which comprises a fuselage 12 having a wing 14 on each side.

Throughout the following description, by convention, the direction X corresponds to the longitudinal direction of the jet engine, this direction being parallel to the longitudinal axis X of this jet engine. Also, the direction Y corresponds to the direction oriented transversely relative to the jet engine, and the direction Z corresponds to the vertical or heightwise direction, these three directions X, Y, Z being mutually orthogonal.

Under each wing 14, there is fixed at least one motorization assembly 100 which comprises a pylon 102 fixed under the wing 14 and an engine 104 fixed to the pylon 102. The engine 104 is, for example, a jet engine and it comprises, among other things, a structural casing which is fixed to the pylon 102 and a nacelle 106 which constitutes the aerodynamic fairing of the engine 104 and which is fixed to both the structural casing and the pylon 102 which takes the form of a box.

Figure 2:
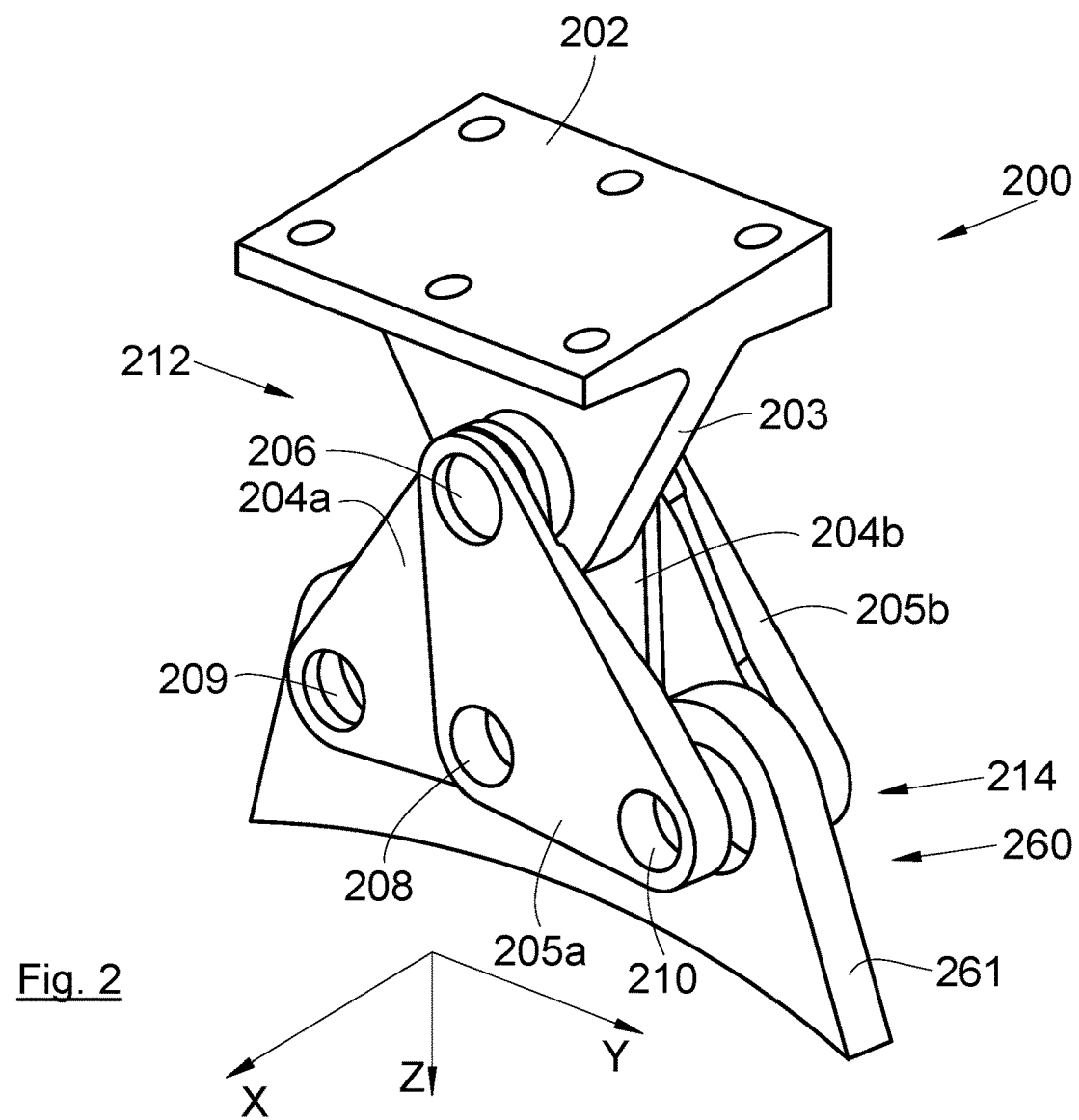
FIG. 2 is a perspective view of a rear engine attachment according to the invention.
Figure 3:
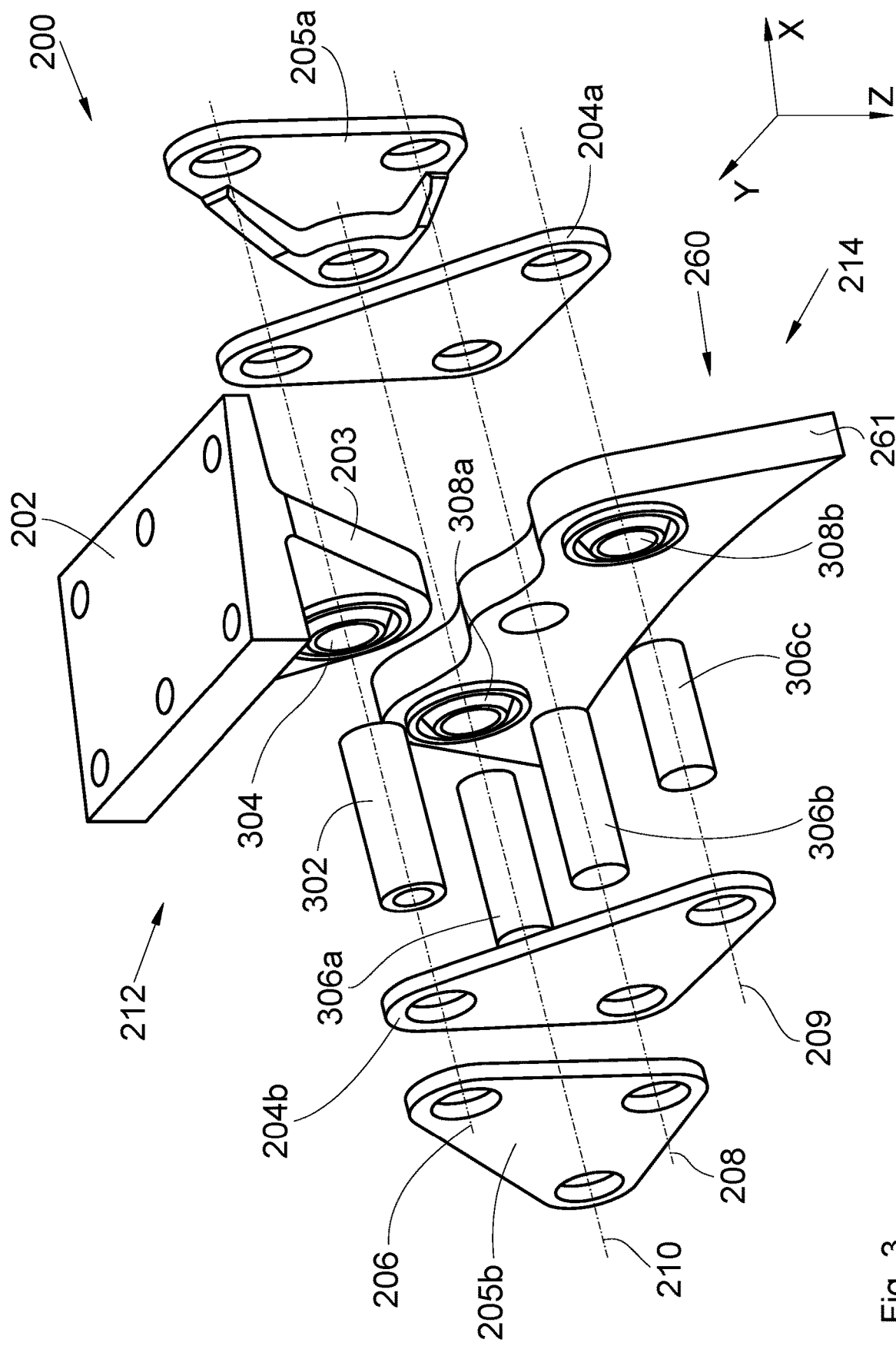
FIG. 3 is an exploded and perspective view of the rear engine attachment of FIG. 2.

The fixing of the structural casing to the pylon 102 is ensured, among other things, at the front, by a front engine attachment and, at the rear, by a rear engine attachment. FIG. 2 shows a rear engine attachment 200 which is fixed between the pylon 102 and the structural casing 260 of the engine 104 and FIG. 3 shows an exploded view of the rear engine attachment 200.

The pylon 102 has a bottom face which is overall horizontal and oriented towards the ground.

The rear engine attachment 200 comprises:

a first fitting 202 which is fixed against the bottom face of the pylon 102 for example using bolts and which comprises a wall 203 which extends in a plane at right angles to the longitudinal axis X and has a front face oriented towards the front of the aircraft 10 and a rear face oriented towards the rear of the aircraft 10, a second fitting 261 which is secured to the structural casing 260 and which takes the form of a wall which extends in a plane at right angles to the longitudinal axis X and has a front face oriented towards the front of the aircraft 10 and a rear face oriented towards the rear of the aircraft 10, a front inner link 204a,
a rear inner link 204b,
a front outer link 205a, and
a rear outer link 205b.

The wall 203 is disposed overall vertically above the second fitting 261.

The front inner link 204a has a rear face which is positioned facing the front face of the wall 203 and the front face of the second fitting 261.

The rear inner link 204b has a front face which is positioned facing the rear face of the wall 203 and the rear face of the second fitting 261.

The front outer link 205a has a rear face which is positioned facing the front face of the front inner link 204a.

The rear outer link 205b has a front face which is positioned facing the rear face of the rear inner link 204b.

The front inner link 204a is fixed by a main link point 206 to the wall 203 of the first fitting 202 and by a first and a second link points 208 and 209 to the second fitting 261 of the structural casing 260.

The front outer link 205a is fixed by the same main link point 206 to the wall 203 of the first fitting 202 and by the same first and another second link points 208 and 210 to the second fitting 261 of the structural casing 260.

The rear inner link 204b is fixed by the same main link point 206 to the wall 203 of the first fitting 202 and by the same first and the same second link points 208 and 209 to the second fitting 261 of the structural casing 260 as the front inner link 204a but on the other side of the wall 203.

The rear outer link 205b is fixed by the same main link point 206 to the wall 203 of the first fitting 202 and by the same first and the same second link points 208 and 210 to the second fitting 261 of the structural casing 260 as the front outer link 205a but on the other side of the wall 203.

Each link 204a-b, 205a-b thus has three link points.

The main link point 206 and the first link point 208 are overall aligned vertically, while the two second link points 209 and 210 are disposed on either side of the first link point 208 relative to a vertical medium plane XZ.

Each link 204a-b 205a-b thus has only two link points with the structural casing 260.

Such an assembly therefore has relatively little bulk and the links 204a-b, 205a-b have relatively simple forms, here triangular plates.

Each link point 206, 208, 209, 210 constitutes an assembly between at least two parts and the assembly comprises at least one degree of freedom in rotation about an axis parallel to the longitudinal axis X. That means that the parts linked at a link point exhibit, among other things, at least a possible rotation about the axis parallel to the longitudinal axis X.

The duly constituted assembly takes the form of a double yoke joint 212, 214 where the flanks comprise, on the front side, the front links 204a and 205a and, on the rear side, of the rear links 204b and 205b, where, for one yoke joint 212, the wall 203 is positioned between these flanks, and where, for another yoke joint 214, the second fitting 261 is positioned between these flanks.

The main link point 206 to the first fitting 202 thus comprises a bore passing through the wall 203, a bore passing through each link 204a-b 205a-b and an axis 302, in particular a double shearing axis, which is fitted into the bore of each link 204a-b 205a-b and into the bore of the wall 203. A double shearing axis comprises two axes fitted into one another. The fixing of the axis 302 into the bore of the wall 203 is performed in particular through a ball joint link 304.

Each link point 208, 209, 210 to the second fitting 261 comprises a bore passing through the second fitting 261, for each link 204a-b 205a-b associated with the link point 208, 209, 210, of a bore passing through the link 204a-b 205a-b and of an axis 306a-c, in particular a single shearing axis, which is fitted into the bore of each link 204a-b 205a-b and into the bore of the second fitting 261.

For the second link points 209 and 210, the fixing of the axis into the bore of the link 204a-b is performed in particular through a ball joint link 308a-b.

The first and the second link points 208, 209 and 210 ensure the fixing of the links 204a-b 205a-b to the structural casing 260.

The axes of the yoke joints 212 and 214, and the axes of the bores constitute the axes of rotation of the link points and are parallel to the longitudinal axis X.

Each second link point 209, 210 is mounted without play, that is to say, that there is no possible linear movement, on the one hand, between the inner links 204a-b and the axis, 306c associated with the second link point 209, on the other hand, between the outer links 205a-b and the axis 306a associated with the second link point 210, and between the second fitting 261 and the axis 306a, 306c associated with the second link point 209, 210. The only possible movements are rotational movements, in particular through the ball joint link 308a-b.

Likewise, the main link point 206 is mounted without play, that is to say, there is no possible linear movement, on the one hand, between the links 204*a*-*b*, 205*a*-*b* and the axis 302, and, on the other hand, between the wall 203 and the axis 302. The only possible movements are rotational movements, in particular through the ball joint link 304.

The first link point 208 is loose, that is to say, mounted with play, at the second fitting 261, that is to say that, not only are rotational movements possible, but also linear movements are possible between the second fitting 261 and the axis 306*b*.

The first link point 208 is mounted without play at the inner links 204*a*-*b*, that is to say that there is no possible linear movement between the inner links 204*a*-*b* and the axis 306*b* and the only possible movements are rotational movements.

The first link point 208 is loose, that is to say, mounted with play, at the outer links 205*a*-*b*, that is to say that, not only are rotational movements possible, but also linear movements are possible between the outer links 205*a*-*b* and the axis 306*b*.

By virtue of linear freedom of movement, the rear engine attachment 200 forms an isostatic assembly and allows a displacement of the outer links 205*a*-*b* and a displacement of the axis 306*b* in the bore of the second fitting 261 in case of thermal expansion of the engine. Thus, the outer links 205*a*-*b* can be brought tighter together or moved apart like scissors by rotation about the main link point 206. This freedom of movement is produced by the fact that the diameters of the bores of the outer links 205*a*-*b* and of the second fitting 261 are greater than the diameter of the axis 306*b* at the first link point 208.

Through the main link point 206 and each second link point 209, 210, the first fitting 202 and the links 204*a*-*b* 205*a*-*b* define, together, a primary path for loads between the engine and the pylon to withstand the loads of the engine. The first link point 208 constitutes a standby safety fixing point that is activated in case of failure of the primary load path and which creates an auxiliary load path between the engine and the jet engine pylon.

Because of the difference in diameter between the bores of the outer links 205*a*-*b* producing the first link point 208 and the axis 306*b*, in normal operation, there is no contact between the axis 306*b* and the outer links 205*a*-*b*, and in case of problems, the structural casing 260 is displaced and the axis 306*b* then comes into contact with at least one of the outer links 205*a*-*b*.

As it is, and unlike the prior art, the rear engine attachment according to the invention is not made to transmit the torsional movement (Mx) of the jet engine to the airplane structure. It is intended to be associated with a front engine attachment to constitute an isostatic system of engine attachments.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rear engine attachment for an engine of an aircraft which comprises a pylon having a bottom face, the rear engine attachment comprising:
    a first fitting configured to be fixed against the bottom face and comprising a wall which extends in a plane at right angles to a longitudinal axis X and having a front face configured to be oriented towards a front of the aircraft and a rear face configured to be oriented towards a rear of the aircraft,
    a second fitting configured to be secured to a structural casing of the engine, the second fitting extending in a plane at right angles to the longitudinal axis X and having a front face configured to be oriented towards the front of the aircraft and a rear face configured to be oriented towards the rear of the aircraft,
    a front inner link,
    a rear inner link,
    a front outer link, and
    a rear outer link,
    wherein the front inner link has a rear face which is positioned facing a front face of the wall and facing the front face of the second fitting,
    wherein the rear inner link has a front face which is positioned facing a rear face of the wall and facing the rear face of the second fitting,
    wherein the front outer link has a rear face which is positioned facing a front face of the front inner link,
    wherein the rear outer link has a front face which is positioned facing a rear face of the rear inner link,
    wherein the front inner link is fixed by a main link point to the wall and by a first link point and a second link point to the second fitting,
    wherein the front outer link is fixed by the same main link point to the wall and by the same first link point and another second link point to the second fitting,
    wherein the rear inner link is fixed by the same main link point to the wall and by the same first and the same second link points to the second fitting as the front inner link,
    wherein the rear outer link is fixed by the same main link point to the wall and by the same first and the same second link points to the second fitting as the front outer link,
    wherein at each of the link points, the four links and either the first or second fitting, are fixed by a common fixing element extending along an axis parallel to the longitudinal axis X.

2. The rear engine attachment according to claim 1, wherein the main link point comprises a bore passing through the wall, a bore passing through each link and an axis which is fitted into the bore of each link and into the bore of the wall, wherein each link point to the second fitting comprises a bore passing through the second fitting, for each link associated with the link point, a bore passing through said link and an axis which is fitted into the bore of each link and into the bore of the second fitting.

3. The rear engine attachment according to claim 2, wherein that the main link point is mounted without play, wherein each second link point is mounted without play, wherein the first link point is mounted with play at the second fitting, wherein the first link point is mounted without play at the front and rear inner links, and wherein the first link point is mounted with play at the front and rear outer links.

4. An aircraft comprising a pylon having a bottom face, an engine having a structural casing and a rear engine attachment according to claim 1, wherein the first fitting is fixed against said bottom face, and wherein the second fitting is secured to the structural casing.

5. The rear engine attachment according to claim 1, wherein each of the links is triangular in shape.

6. The rear engine attachment according to claim 5, wherein each of the links has rounded edges.

7. The rear engine attachment according to claim 1, wherein the inner links have a uniform thickness.

8. The rear engine attachment according to claim 2, wherein at least one axis is hollow.

9. The rear engine attachment according to claim 2, wherein the outer links further comprise extended portions, the extended portions being equal in depth to the inner links and extending in the direction of the first and second fittings.

10. The rear engine attachment according to claim 2, wherein the axis which goes through the main link point is a double shear axis.

11. The rear engine attachment according to claim 2, wherein axes which go through the first and second link points are single shear axes.

12. The rear engine attachment according to claim 2, wherein the second link points pass through ball joint links in the second fitting.

13. The rear engine attachment according to claim 2, wherein the main link point passes through a ball joint link in the first fitting.

14. The rear engine attachment according to claim 1, wherein the main link point and the second link points, in combination with the links define a primary load path, and the first link point constitutes a standby safety fixing point.

15. The rear engine attachment according to claim 1, wherein the first fitting is fixed against the bottom face by at least one bolt.

16. The rear engine attachment according to claim 2, wherein the rear engine attachment takes the form of a double yoke joint.

17. The rear engine attachment according to claim 16, wherein the double yoke joint has flanks which comprise the front links on one side and the rear links on the other side, wherein the wall and second fitting are both positioned between these flanks.

18. A rear engine attachment for an engine of an aircraft which comprises a pylon having a bottom face, the rear engine attachment comprising:
- a first fitting configured to be fixed against the bottom face and comprising a wall which extends in a plane at right angles to a longitudinal axis X and having a front face configured to be oriented towards a front of the aircraft and a rear face configured to be oriented towards a rear of the aircraft,
- a second fitting configured to be secured to a structural casing of the engine, the second fitting extending in a plane at right angles to the longitudinal axis X and having a front face configured to be oriented towards the front of the aircraft and a rear face configured to be oriented towards the rear of the aircraft,
- a front inner link,
- a rear inner link,
- a front outer link, and
- a rear outer link,
- wherein the front inner link has a rear face which is positioned facing a front face of the wall and facing the front face of the second fitting,
- wherein the rear inner link has a front face which is positioned facing a rear face of the wall and facing the rear face of the second fitting,
- wherein the front outer link has a rear face which is positioned facing a front face of the front inner link,
- wherein the rear outer link has a front face which is positioned facing a rear face of the rear inner link,
- wherein the front inner link is fixed by a main link point to the wall and by a first link point and a second link point to the second fitting,
- wherein the front outer link is fixed by the same main link point to the wall and by the same first link point and another second link point to the second fitting,
- wherein the rear inner link is fixed by the same main link point to the wall and by the same first and the same second link points to the second fitting as the front inner link,
- wherein the rear outer link is fixed by the same main link point to the wall and by the same first and the same second link points to the second fitting as the front outer link,
- wherein the main link point comprises a bore passing through the wall, a bore passing through each link and an axis which is fitted into the bore of each link and into the bore of the wall,
- wherein each link point to the second fitting comprises a bore passing through the second fitting, for each link associated with the link point, a bore passing through said link and an axis which is fitted into the bore of each link and into the bore of the second fitting.

* * * * *